United States Patent [19]

Frey

[11] Patent Number: 4,966,043

[45] Date of Patent: Oct. 30, 1990

[54] CRANK DRIVE

[76] Inventor: Heinz Frey, Hirtenhofstrasse 13, CH-6005 Luzern, Switzerland

[21] Appl. No.: 295,248

[22] PCT Filed: Apr. 11, 1988

[86] PCT No.: PCT/CH88/00075

§ 371 Date: Nov. 21, 1988

§ 102(e) Date: Nov. 21, 1988

[87] PCT Pub. No.: WO88/08095

PCT Pub. Date: Oct. 20, 1988

[30] Foreign Application Priority Data

Apr. 13, 1987 [CH] Switzerland ............... 1414/87

[51] Int. Cl.⁵ .................. F16H 21/30; F16H 21/20; F02B 75/32
[52] U.S. Cl. .................................. 74/52; 123/197 AC
[58] Field of Search ............ 74/52, 802; 123/197 AC; 92/138

[56] References Cited

U.S. PATENT DOCUMENTS

| | | | |
|---|---|---|---|
| 1,118,285 | 11/1914 | Johnson | 74/52 X |
| 1,210,861 | 1/1917 | Sitney | 74/52 |
| 1,408,439 | 3/1922 | Buckminster | 74/52 |
| 2,369,747 | 2/1945 | Munn | 74/44 |
| 4,073,196 | 2/1978 | Dell | 74/52 |

FOREIGN PATENT DOCUMENTS

| | | | |
|---|---|---|---|
| 898373 | 11/1953 | Fed. Rep. of Germany | |
| 1071600 | 12/1959 | Fed. Rep. of Germany | 74/52 |
| 3634536 | 2/1987 | Fed. Rep. of Germany | |
| 846878 | 9/1939 | France | 74/52 |
| 914211 | 6/1946 | France | |
| 1241833 | 10/1960 | France | |
| 502481 | 11/1954 | Italy | 74/52 |
| 43-21819 | 9/1968 | Japan | 74/52 |
| 57-94157 | 6/1982 | Japan | 74/52 |
| 290688 | 8/1953 | Switzerland | |
| 460936 | 3/1936 | United Kingdom | |

Primary Examiner—Allan D. Herrmann
Attorney, Agent, or Firm—McGlew and Tuttle

[57] ABSTRACT

A crank disc is rotatably mounted on a journal fixed to the casing. A planetary wheel is mounted rotatably and eccentric on the crank disc. The planetary wheel is in forced engagement with a sun wheel arranged coaxially with regard to the crank disc. The sun wheel is fixed to the casing and its reference diameter is double or equal to the reference diameter of the planetary wheel. A pin is arranged on the planetary wheel eccentric to the planetary wheel's axis. The pin is encompassed by the connecting rod bearing of a connecting rod. The crank disc meshes with a pinion of a driven shaft. By this development the characteristics of the crank drive can be chosen within a wide range. Combustion and efficiency can be increased upon employment in a piston combustion motor.

5 Claims, 4 Drawing Sheets

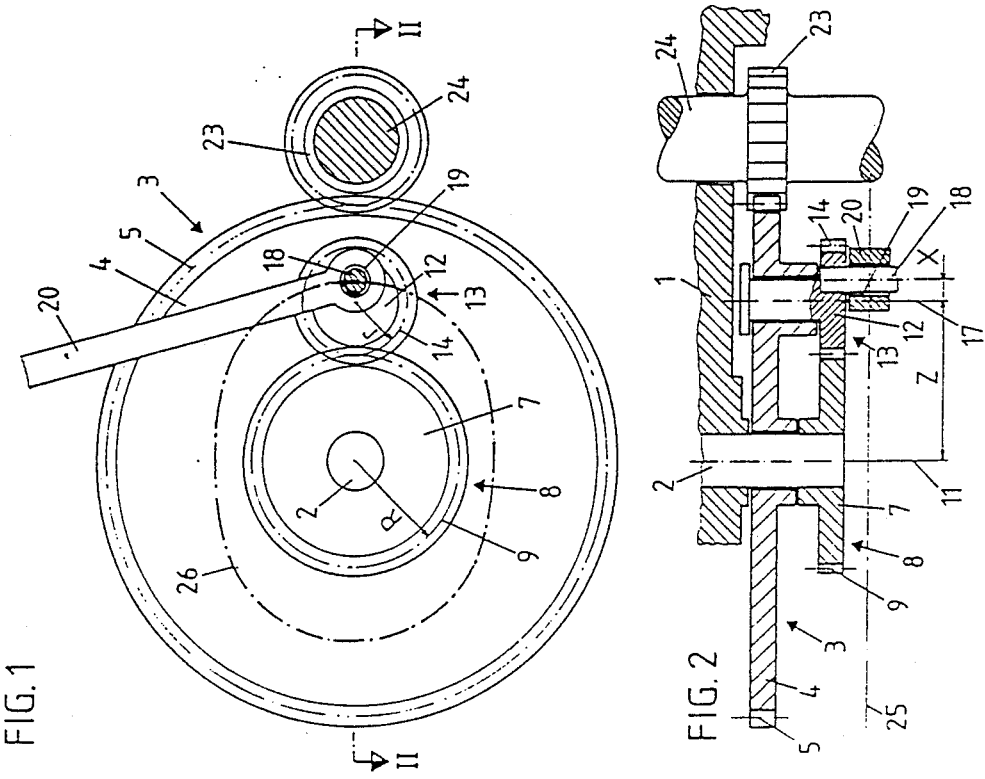

CRANK DRIVE

FIELD AND BACKGROUND OF THE INVENTION

The invention relates to a crank drive as known e.g. in piston motors. Such crank drives comprise a crank shaft and a connecting rod which is linked eccentrically to the crank shaft by means of a connecting rod bearing.

SUMMARY OF THE INVENTION

The invention provides an improvement in the characteristics of a crank drive with regard to the dependence of the travel of the piston relative to the angle of rotation. The improvement is provided by arranging the connecting rod bearing eccentrically on a rotatably mounted planetary wheel. The planetary wheel is in engagement with a sun wheel by non-slip turning surfaces on each wheel. The wheels are advantageously forced against each other. The sun wheel is mounted to the casing. The ratio of the sun wheel diameter to the planetary wheel diameter is substantially equal to 1:1, in at least one embodiment, and substantially equal to 2:1 in other embodiments.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS

In the drawings:

FIG. 1 is a side view of the first embodiment;

FIG. 2 is a section along the line II—II in FIG. 1;

FIG. 3 is a graph of the function of the crank drive according to FIG. 1 and FIG. 2, with crank angle values on the abscissa vs. acceleration on the ordinate;

DESCRIPTION OF THE PREFERRED EMBODIMENTS

Figure 2A:
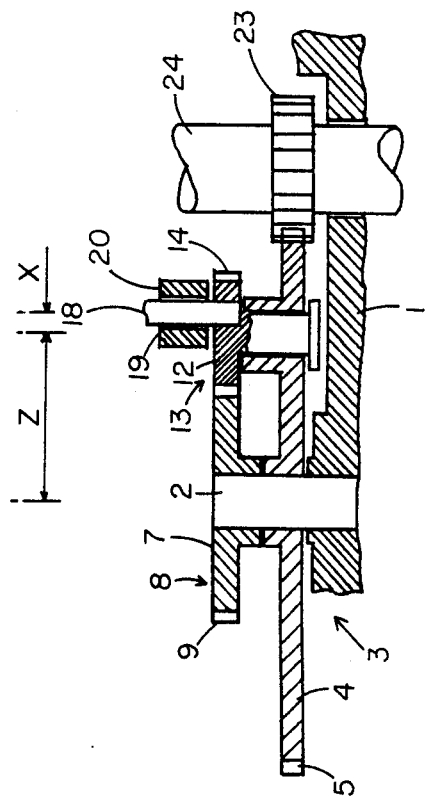
FIG. 2a is a mirror image of FIG. 2.

In the embodiment according to FIG. 1 and FIG. 2 a disc 4 acting as a crank 3 and having external teeth 5 is rotatably mounted in a casing 1 on a cylindrical journal 2. A sun wheel 8 having the shape of a toothed wheel 7 is rigidly and coaxially connected to the journal 2. The journal 2 can be rotated and arrested within limits with regard to the casing 1. A planetary wheel 13 having the shape of a toothed wheel 12 and having externally teeth is mounted rotatably to the crank disc 4. The planetary wheel is mounted eccentrically and parallel to the axis 11 of the journal 2. The teeth 9 of the sun wheel 8 and the teeth 14 of the planetary wheel mesh with one another.

In the present embodiment the geometrical radius r of the planetary wheel 13 is half the size of the geometrical radius R of the sun wheel 8.

The planetary wheel 13 has a paraxial pin 18 being eccentric with an eccentricity X with regard to the axis 17 of the planetary wheel 13. The connecting rod bearing 19 of a connecting rod 20 is rotatable on the pin 18.

The external teeth 5 mesh with a pinion 23 of a paraxial shaft 24. When the crank drive is used in a piston motor, the shaft 24 can be the driven shaft.

The section shown in FIG. 2 is mirrored at the center plane 25 (FIG. 2a), so that two crank discs 4 are rotatable around the axis 11 and mesh with the pinions 23 belonging to the crank disks on the shaft 24. The crank discs 4 carry a planetary wheel 13 each. These planetary wheels 13 are rigidly connected with each other by the pin 18 and they mesh with one sun wheel 7 each. For better visibility, however, the parts arranged symmetrically to the center plane 25 have been omitted in FIG. 2.

During operation, the pin 18 and with it the connecting rod bearing 19 move on an approximately elliptical orbit around the journal 2. By choosing the eccentricity X of the pin 18 on the planetary wheel 13 relative to the distance Z between the axes 11 and 17, the characteristics of the crank drive can be changed significantly with regard to a conventional crank drive equivalent to the value X/Z=0.

FIG. 3 shows diagrammatically, as an example, the piston accelerations (a) at a constant piston stroke as plotted against crank angle, for crank angles of from 0° to 180°, at different eccentricities X/Z.

The piston accelerations in the top dead center can be reduced to any small value, as can be seen from FIG. 3. Accordingly, a piston combustion motor has a relatively large angle of rotation for the ignition in the top dead center. Therefore, the combustion can be optimized and finished completely before the expansion begins. Because of the correspondingly faster expansion heat loss through the walls is reduced, therefore the expansion becomes more adiabatic.

In the bottom dead center the piston practically stops at an angle of about 60°. Therefore there is ample time for the valve control mechanism to open the valves, thereby minimizing valve losses. The part of the working stroke used becomes longer, which increases energy exploitation. The piston stroke can be adjusted easily during operation by turning the journal 2 in the casing 1. The turning of the journal in turn rotates the sun wheel. Due to this the compression is adjusted to the speed and the output. Therefore the motor becomes substantially more elastic.

The described crank drive can be counterbalanced mechanically.

Figure 4:
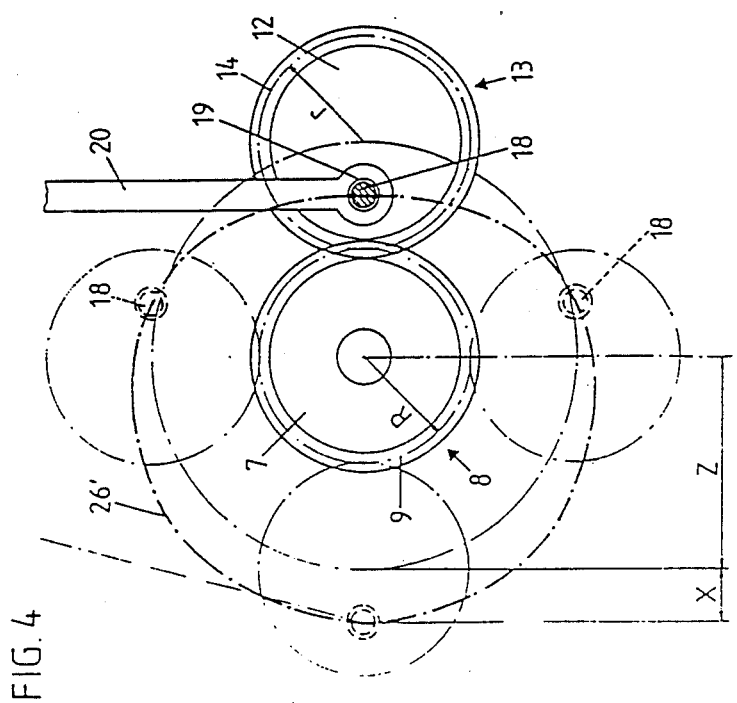
FIG. 4 is a side view of a second embodiment.

The embodiment according to FIG. 4 differs from the embodiment according to FIGS. 1 and 2 only in that the planetary wheel 13 has the same geometrical radius as the sun wheel 8 (R/r=1). According to this embodiment the planetary wheel 13 rotates twice instead of three times during one rotation of the crank. The angle of rotation between the top dead center and the bottom dead center differs from 180°. In FIG. 4 the pins 18 are shown as a dotted line at a crank angle of +−90° from the center position shown. In this embodiment, when used in a piston combustion motor e.g., the crank angle for the expansion can be chosen larger than the crank angle for the compression. Therefore the torque of the driven end of shaft can work over a larger angle of rotation. With multiple cylinder machines these angles of rotations can overlap to reduce torque vibrations.

Figure 5:
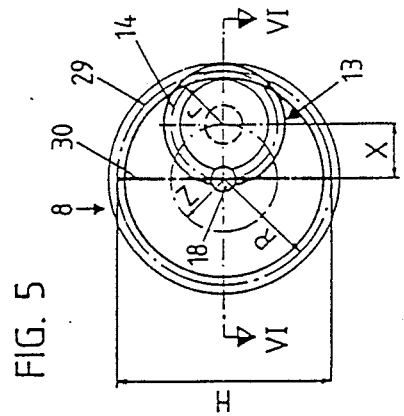
FIG. 5 is a side view of a third embodiment.
Figure 6:
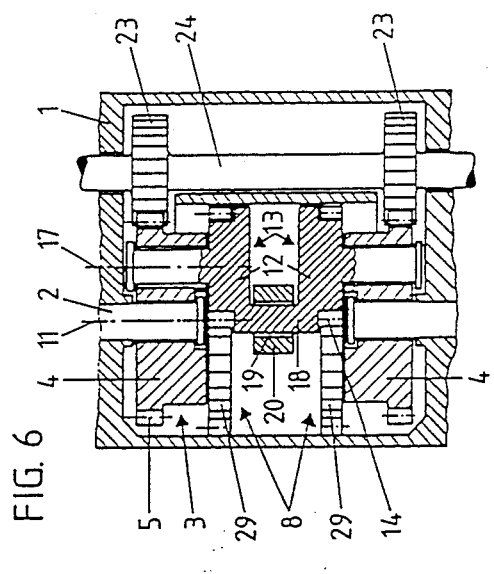
FIG. 6 is a section along the line VI—VI in FIG. 5.

The embodiment according to FIG. 5 and FIG. 6 differs from the embodiment according to FIG. 1 and FIG. 2 in that the sun wheel 8 mounted to the casing is formed by two coaxial internal tooth gears 29 which mesh with teeth 14 of two toothed wheels 12 coaxial to one another. The toothed wheels 12 form the planetary wheels 13 and are rigidly connected to each other via the pin 18. They are rotatably mounted on two crank discs 4 which are coaxial with regard to one another. The crank discs 4 are rigidly connected with regard to one another but they rotate together via teeth 5, the pinions 23 and the shaft 24. In this embodiment according to FIG. 5 and FIG. 6 the eccentricity X of the pin 18 relative to the planetary wheel axis 17 is equal to the geometrical radius r of the planetary wheels 13 and half the geometrical radius R of the internal teeth 29. By means of this embodiment, the path 30 of the pin 18 and of the connecting rod bearing 19 is a straight line, the stroke H being equivalent to the reference diameter of the teeth 29.

The embodiment shown in FIGS. 5 and 6 has the advantage that the piston can be connected rigidly to the piston rod and exercises nearly no lateral force on the cylinder wall. This results in little attrition, also, the piston can be very light. Furthermore the crank case can be sealed off from the cylinder chamber very easily, and thus the piston can be a double acting piston. This is advantageous e.g. for steam engines and pneumatic motors and compressors.

Figure 7:
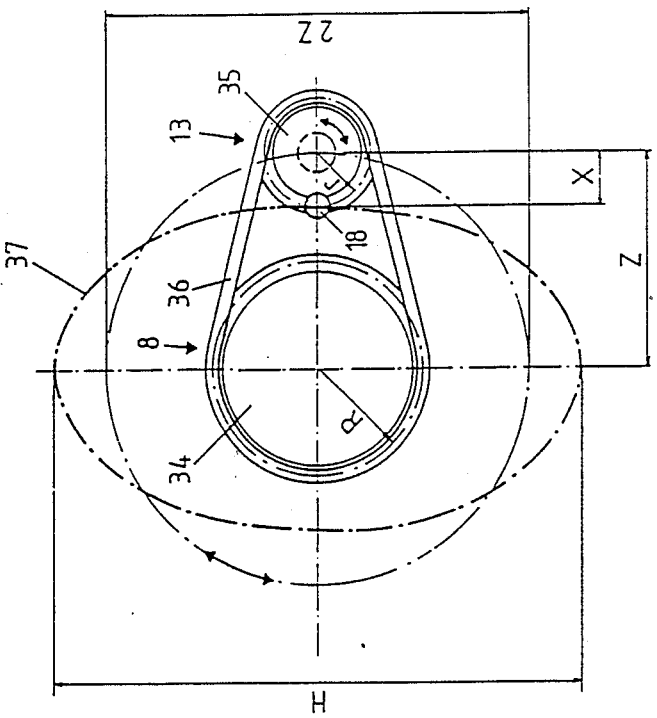
FIG. 7 is a schematic side view of a fourth embodiment.

FIG. 7 shows a further version of the crank drive according to the invention. Here the sun wheel 8 which is mounted to the casing and the planetary wheel 13 are both sprockets 34 and 35 respectively. The geometrical radius r of the sprocket 35 is half the geometrical radius of the sprocket 34. The sun sprocket 34 and the planetary sprocket 35 are connected with one another via a tight chain 36.

The other features of the embodiment according to FIG. 7 correspond to the embodiment according to FIG. 1 and FIG. 2. In both embodiments the pin 18 has an approximately elliptical orbit 37.

While specific embodiments of the invention have been shown and described in detail to illustrate the application of the principles of the invention, it will be understood that the invention may be embodied otherwise without departing from such principles.

I claim:

1. A crank drive comprising;
   a crank with a crank turning axis;
   a sun wheel having a central axis arranged coincident with said crank turning axis and being rotationally arrestable said sun wheel having external teeth, said sun wheel having a radius R;
   a planetary wheel mounted rotatably on said crank and having a planetary turning axis arranged at a distance from said crank turning axis;
   a means for providing a continuous rotational interengagement between said sun wheel and said planetary wheel including teeth provided on said planetary wheel which intermesh with said sun wheel external teeth, said planetary wheel having a radius r, said sun wheel having radius R substantially equal to two times the planetary wheel radius r;
   a connecting rod with one end mounted rotationally to a rod axis pin provided on said planetary wheel at a distance X from said planetary turning axis, the ratio of the distance X (the eccentricity of the rod axis pin on said planetary wheel) to a distance Z between said crank turning axis and said planetary turning axis being less than or equal to 1/9.

2. A crank drive according to claim 1, further comprising:
   a casing;
   said crank being disc shaped and rotatably connected to said casing;
   a disc-shaped second crank being rotatably connected to said casing and coaxial with said crank, said secondary crank having a secondary crank diameter equal to said crank diameter;
   a second planetary wheel being arranged coaxially with said planetary wheel, said second planetary wheel having a second planetary wheel diameter equal to said planetary diameter;
   said connecting rod end being further rotatably connected to said planetary wheel at said connecting rod rotational axis;
   a second sun wheel being coaxial with said sun wheel and having a second sun wheel diameter equal to said sun wheel diameter, said second sun wheel being arrestably connected to said casing, and said sun wheel being connected to said casing;
   said second planetary wheel being in forced non-slip turning engagement with said second sun wheel.

3. A crank according to claim 1, wherein said connecting rod end follows a substantially elliptical path.

4. A crank according to claim 3, wherein said path is adjustable by rotating said sun wheel.

5. A crank according to claim 1, further comprising, a drive shaft, a driven pinion wheel mounted on said drive shaft, said crank being a disc with an exterior surface being in continuous rotational engagement with said pinion wheel.

* * * * *